United States Patent
Na et al.

(10) Patent No.: US 11,419,180 B2
(45) Date of Patent: Aug. 16, 2022

(54) BASE STATION APPARATUS AND DATA PACKET TRANSMISSION METHOD

(71) Applicant: SK TELECOM CO., LTD., Seoul (KR)

(72) Inventors: Min Soo Na, Seoul (KR); Gi Wan Choi, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/758,100

(22) PCT Filed: Jan. 12, 2018

(86) PCT No.: PCT/KR2018/000615
§ 371 (c)(1),
(2) Date: Apr. 22, 2020

(87) PCT Pub. No.: WO2019/083097
PCT Pub. Date: May 2, 2019

(65) Prior Publication Data
US 2020/0337113 A1    Oct. 22, 2020

(30) Foreign Application Priority Data
Oct. 25, 2017   (KR) .................. 10-2017-0139401

(51) Int. Cl.
| | |
|---|---|
| *H04W 80/08* | (2009.01) |
| *H04L 5/00* | (2006.01) |
| *H04L 25/02* | (2006.01) |
| *H04L 27/36* | (2006.01) |
| *H04W 74/08* | (2009.01) |
| *H04W 80/02* | (2009.01) |

(52) U.S. Cl.
CPC .......... *H04W 80/08* (2013.01); *H04L 5/0051* (2013.01); *H04L 25/0226* (2013.01); *H04L 27/364* (2013.01); *H04W 74/0833* (2013.01); *H04W 80/02* (2013.01)

(58) Field of Classification Search
None
See application file for complete search history.

(56) References Cited

U.S. PATENT DOCUMENTS

2010/0239256 A1 *  9/2010  Zheng .............. H04B 10/25754
                                                    398/66
2011/0019668 A1 *  1/2011  Diab ................... H04L 47/624
                                                    370/389

FOREIGN PATENT DOCUMENTS

WO   WO 2017/100394   6/2017

OTHER PUBLICATIONS

International Search Report dated Jul. 25, 2018 issued in Application No. PCT/KR2018/000615.
(Continued)

*Primary Examiner* — Diane L Lo
(74) *Attorney, Agent, or Firm* — Ked & Associates, LLP

(57) ABSTRACT

Disclosure is a BS apparatus and a method of transmitting a data packet capable of supporting smooth transmission of a data packet by defining a new fronthaul interface considering a structure of expanding/designing processing functions of a radio module of a 5G split BS including not only an RF processing function but also a processing function on a higher layer.

9 Claims, 9 Drawing Sheets

(56) References Cited

OTHER PUBLICATIONS

Ericsson AB et al., "eCPRI Specification V1.0", Common Public Radio Interface: eCPRI Interface Specification, Aug. 22, 2017.
Accordance, "Mapping of Radio Signals to Optical Resources and Distribution of Mapping within the Network", D5.4, Accordance_D5.4_WP5_2011_30 November_UH_v1.0.docx, Version: 1.0, Nov. 30, 2011.
3GPP TR 38.801 V14.0.0, $3^{rd}$ Generation Partnership Project; Technical Specification Group Radio Access Network; study on New Radio Access Technology: Radio Access Architecture and Interfaces (Release 14), Apr. 3, 2017.
Mustala, Tero et al., "Common Public Radio Interface", eCPRI Overview, cm-mustala-eCPRI-Overview-0917, Sep. 6, 2017.
Korean Office Action dated May 7, 2019 issued in Application No. 10-2017-0139401 (English translation attached).

* cited by examiner

FIG. 6

| | | W= | 0 | 1 | 2 | 3 | 4 | | 15 |
|---|---|---|---|---|---|---|---|---|---|
| LSB | B=0: A | | | i0 | i8 | i1 | i9 | ...... | |
| | B=1: B | | | q0 | q8 | q1 | q9 | ...... | |
| | B=2: C | Y=0 | | i1 | i9 | i2 | i10 | ...... | |
| | B=3: D | | | q1 | q9 | q2 | q10 | ...... | |
| | B=4: E | | | i2 | i10 | i3 | i11 | ...... | |
| | B=5: F | | | q2 | q10 | q3 | q11 | ...... | |
| | B=6: G | | | i3 | i11 | i4 | i12 | ...... | |
| MSB | B=7: H | | | q3 | q11 | q4 | q12 | ...... | |
| LSB | B=0: A | | | i4 | i12 | i5 | i13 | ...... | |
| | B=1: B | | | q4 | q12 | q5 | q13 | ...... | |
| | B=2: C | Y=1 | | i5 | i13 | i6 | i14 | ...... | |
| | B=3: D | | | q5 | q13 | q6 | q14 | ...... | |
| | B=4: E | | | i6 | i14 | i7 | | ...... | |
| | B=5: F | | | q6 | q14 | q7 | | ...... | |
| | B=6: G | | | i7 | i0 | i8 | | ...... | |
| MSB | B=7: H | | | q7 | q0 | q8 | | ...... | |

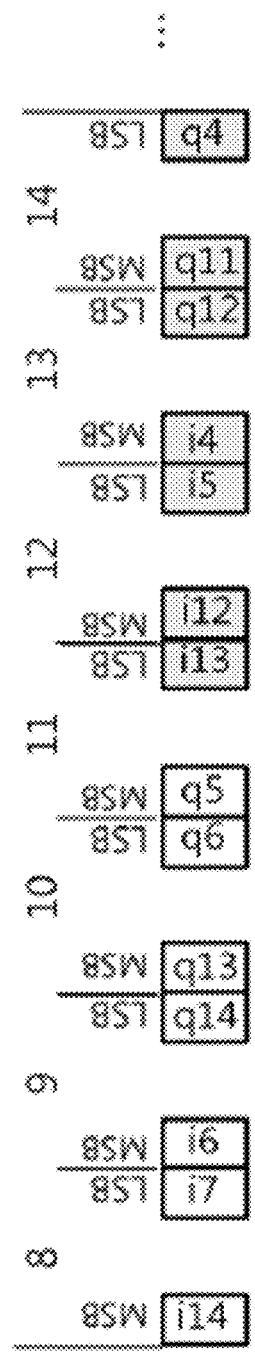

BASE STATION APPARATUS AND DATA PACKET TRANSMISSION METHOD

CROSS-REFERENCE TO RELATED PATENT APPLICATIONS

This application is a U.S. National Stage Application under 35 U.S.C. § 371 of PCT Application No. PCT/KR2018/000615, filed Jan. 12, 2018, which claims priority to Korean Patent Application No. 10-2017-0139401, filed Oct. 25, 2017, whose entire disclosures are hereby incorporated by reference.

BACKGROUND OF THE INVENTION

1. Field of the Invention

The present disclosure relates to a new fronthaul interface for transmitting a data packet (user plane data) to a radio module in a split base station in which the radio module is separately configured.

2. Description of the Prior Art

As communication service types and required transmission rates are diversified in an LTE communication system, an increase LTE frequencies and evolution to a 5G communication system have been actively conducted.

The 5G communication system supports scenarios of enhanced Mobile Broadband (eMBB), massive Machine Type Communications (mMTC), and ultra-Reliable and Low Latency Communications (uRLLC), while accommodating as many terminals as possible on the basis of limited radio resources.

Meanwhile, a Base Station (BS) apparatus may consist of a BS module (Digital Unit (DU)) and a radio module (Remote Unit (RU)) according to internal functions.

Recently, various types of BS have appeared including an integrated BS type in which the BS module (DU) and the radio module (RU) are integrated and a split BS type in which the BS module (DU) and the radio module (RU) are separated and installed/configured in remote distances.

In the future, the 5G communication system will expand the role of the radio module (RU), which simply has served only to transmit and receive signals (data), and serve to perform a processing function on a higher layer that was performed by the BS module (DU) in the split BS.

For reference, in the 5G communication system, the BS module is defined as a Central Unit (CU) and the radio module is defined as a Distributed Unit (DU).

Meanwhile, in the case of a split BS in the LTE communication system, a fronthaul protocol such as a Common Public Radio Interface (CPRI) is used to transmit data and signals between the BS module (DU) and the radio module (RU).

The CPRI is an I/Q sample stream of RF signals transmitted/received by antennas and corresponds to an interface designed to transmit signals through an optical fiber between the BS module (DU) and the radio module (RU) at various speeds and in various encoding types.

However, in the case of the split BS in the 5G communication system, another fronthaul interface different from the conventional CPRI is needed to transmit data and signals between the BS module (CU) and the radio module (DU).

This is because 5G requires significantly larger fronthaul capacity than before to use a wider carrier bandwidth which is a several times to many times larger compared to LTE (4G) and support massive MIMO.

Accordingly, the 5G split BS requires a new fronthaul interface definition having a structure to reduce capacity of the fronthaul for transmitting a data packet to the radio module.

Accordingly, the present disclosure defines a new fronthaul interface to transmit data packets to the radio module (DU) in the 5G split BS.

SUMMARY OF THE INVENTION

The present disclosure has been made to solve the above described problem and an aspect of the present disclosure is to define a new fronthaul interface for transmitting a data packet to a radio module in a 5G split BS.

In accordance with an aspect of the present disclosure, a Base Station (BS) apparatus includes: a radio module configured to perform at least one processing function of a plurality of processing functions required to transmit a data packet by the BS apparatus; and a communication module configured to perform the remaining processing functions of the plurality of processing functions, wherein the data packet is transmitted between the radio module and the communication module by selecting a field value within a frame format of a specific interface to define a type of the data packet determined according to at least one processing function and the remaining processing functions, packetizing the data packet, of which the type is defined, to be supported by the specific interface, and transmitted through the specific interface.

Specifically, the frame format may include a common field including a subtype field for defining the type of the data packet and a payload field for transmitting the data packet.

Specifically, the common field may further include at least one of a flow ID field for defining flow related to a connection between nodes corresponding to the radio module and the communication module and a length field indicating the number of all octets of the frame format.

Specifically, when the data packet is defined as a specific type according to a field value of the subtype field, the common field may include a payload sub-header allocated to select a field value for identifying the data packet of the specific type.

Specifically, the data packet of the specific type may be I/Q data in a frequency domain or a time domain, and the I/Q data may be defined as one of I/Q modulation information, Sounding Reference Signal (SRS) information, and Physical Random Access Channel (PRACH) information according to a field value of the payload sub-header.

Specifically, the I/Q modulation information may be packetized and transmitted for each of antennas within a symbol, and each piece of the SRS information and the PRACH information may be packetized and transmitted separately from the I/Q data for transmission of information on all antennas.

Specifically, the communication module may be a BS module including some processing functions on a PHY layer and processing functions on a layer higher than some processing functions on the PHY layer or a higher radio module including some processing functions on the PHY layer and processing functions on a Medium Access Control (MAC) layer and a Radio Link Control (RLC) layer and connected to the BS module including processing functions on a Packet Data Convergence Protocol (PDCP) layer and a layer higher than the PDCP layer.

In accordance with another aspect of the present disclosure, a method of transmitting a data packet includes: defining, by a communication module, a type of a data packet determined according to at least one processing function and remaining processing function by selecting a field value within a frame format of a specific interface, the communication module being connected to a radio module configured to perform the at least one processing function among a plurality of processing functions required to transmit the data packet in a Base Station (BS) apparatus and configured to perform the remaining processing functions among the plurality of processing functions; and packetizing, by the communication module, the data packet, of which the type is defined, to be supported by the specific interface and transmitting the data packet to the radio module through the specific interface.

Specifically, the frame format may include a common field including a subtype field for defining the type of the data packet and a payload field for transmitting the data packet.

Specifically, the common field may further include at least one of a flow ID field for defining flow related to connection between nodes corresponding to the radio module and the communication module and a length field indicating the number of all octets of the frame format.

Specifically, the method may further include an allocation step of, when the data packet is defined as a specific type according to a field value of the subtype field, allocating a payload sub-header for selecting a field value for identifying the data packet of the specific type to the common field before the transmission step.

Specifically, the data packet of the specific type may be I/Q data in a frequency domain or a time domain, and the I/Q data may be defined as one of I/Q modulation information, Sounding Reference Signal (SRS) information, and Physical Random Access Channel (PRACH) information according to a field value of the payload sub-header.

Specifically, the I/Q modulation information may be packetized and transmitted for each of antennas within a symbol, and each piece of the SRS information and the PRACH information may be packetized and transmitted separately from the I/Q data for transmission of information on all antennas.

According to a BS apparatus and a method of transmitting a data packet of the present disclosure, it is possible to support smooth transmission of a data packet by defining a new fronthaul interface considering a structure of expanding/designing processing functions of a radio module of a 5G split BS to include not only an RF processing function but also a processing function on a higher layer.

BRIEF DESCRIPTION OF THE DRAWINGS

FIGS. 4A, 4B, 5A, 5B, 5C, 6, 7A, 7B and 8 illustrate formats of a frame and a field of a fronthaul interface according to an embodiment of the present disclosure.

DETAILED DESCRIPTION OF THE EXEMPLARY EMBODIMENTS

Hereinafter, exemplary embodiments of the present disclosure will be described with reference to the accompanying drawings.

The present disclosure relates to a split BS technology to be used by a 5G communication system in connection with the future 5G communication system which is currently being actively evolved/discussed.

As communication service types and required transmission rates are diversified in an LTE communication system, an increase in LTE frequencies and evolution to a 5G communication system have been actively conducted.

The 5G communication system supports scenarios of enhanced Mobile Broadband (eMBB), massive Machine Type Communications (mMTC), and ultra-Reliable and Low Latency Communications (uRLLC) while accommodating as many terminals as possible on the basis of limited radio resources.

Meanwhile, a Base Station (BS) apparatus may be divided into a BS module (Digital Unit (DU)) and a radio module (Remote Unit (RU)) according to internal functions.

Recently, various types of BS have appeared including an integrated BS type in which the BS module (DU) and the radio module (RU) are integrated and a split BS type in which the BS module (DU) and the radio module (RU) are separated and installed/configured in remote distances.

In the future, the 5G communication system will expand the role of the radio module (RU), which simply served only to transmit and receive signals (data), and serve to perform a processing function on a higher layer that was performed by the BS module (DU) in the split BS.

In the 5G communication system, the BS module included in the split BS is defined as a Central Unit (CU) and the radio module is defined as a Distributed Unit (DU).

Figure 1A:
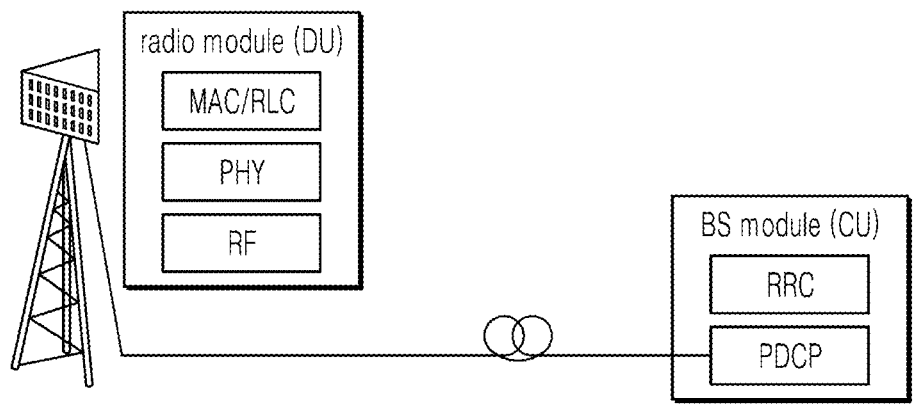
FIGS. 1A, 1B, 2A and 2B illustrate the structure of a BS apparatus according to an embodiment of the present disclosure.
Figure 1B:
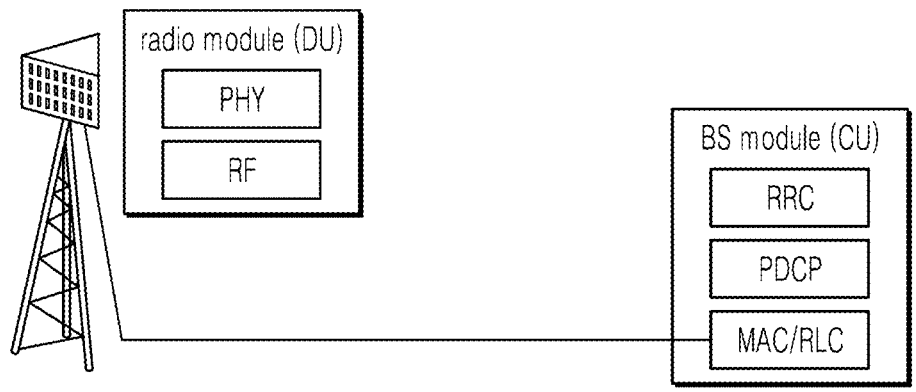

An expansion model of the radio module discussed by the 5G communication includes a model (case #1, a higher layer split-based integrated DU/antenna structure) further including a processing function on a Medium Access Control (MAC) layer and a Radio Link Control (RLC) layer in the radio module (DU) as illustrated in FIG. 1A and a model (case #2, a lower layer split-based baseband pooling structure) including an RF processing function and a processing function to a Physical (PHY) layer in the radio module (DU) as illustrated in FIG. 1B.

An embodiment of the present disclosure follows the model having the lower layer split-based baseband pooling structure including the RF processing function and the processing function on the PHY layer in the radio model (DU) among the above models.

Figure 2A:
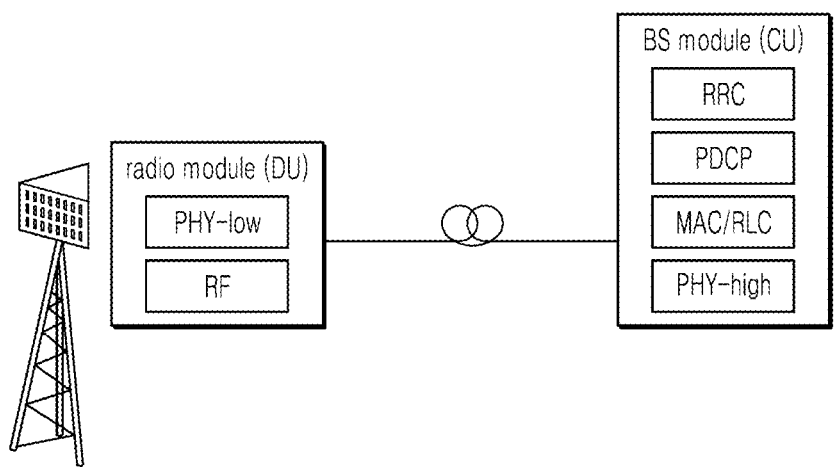
Figure 2B:
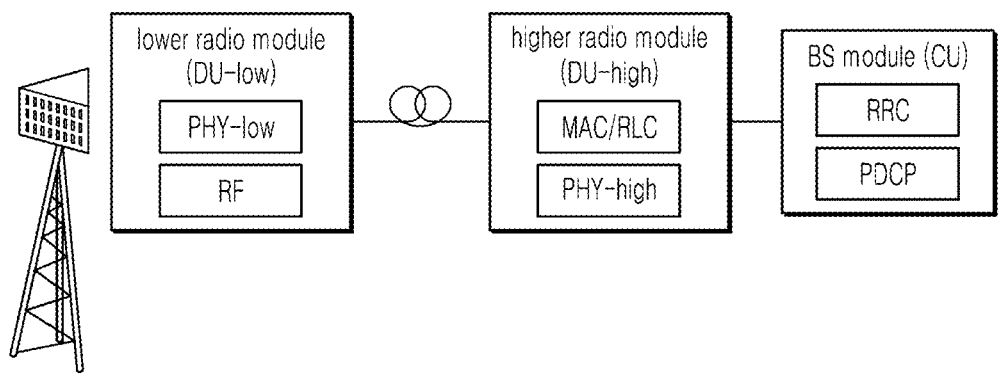

Further, the model having the lower layer split-based baseband pooling structure adopted according to an embodiment of the present disclosure may have two models according to the structure of the radio module (DU) as illustrated in FIGS. 2A and 2B.

One model is an integrated DU model and includes the RF processing function and some processing functions on the PHY layer (PHY-low) in the radio module (DU) as illustrated in FIG. 2A.

The BS module (CU) connected to the radio module (DU) may include higher layer processing functions, that is, some processing functions on the PHY layer (PHY-high) and processing functions on the MAC layer, the RLC layer, the Packet Data Convergence Protocol (PDCP) layer, and the Radio Resource Control (RRC) layer.

The other one is a separated DU model and divides the radio module (DU) into a lower radio module (DU-low) and a higher radio module (DU-high) and includes the RF processing function and some processing functions on the PHY layer (PHY-low) in the lower radio module (DU-low) as illustrated in FIG. 2B.

Further, the other one includes some processing functions on the PHY layer (PHY-high) and processing functions on the MAC layer and the RLC layer in the higher radio module (DU-high) and includes processing functions on the PDCP layer and the RRC layer in the BS module (CU).

Meanwhile, in the case of the split BS in the LTE communication system, a fronthaul protocol such as a Common Public Radio Interface (CPRI) is used to transmit data and signals between the BS module (DU) and the radio module (RU).

The CPRI is an I/Q sample stream of RF signals transmitted/received by antennas and corresponds to an interface designed to transmit signals through an optical fiber between the BS module (DU) and the radio module (RU) at various speeds and in various encoding types.

However, in the case of the split BS in the 5G communication system, another fronthaul interface different from the conventional CPRI is needed to transmit data and signals between the BS module (CU) and the radio module (DU).

This is because 5G requires significantly larger fronthaul capacity than before to use a wider carrier bandwidth several times to many times larger compared to conventional LTE (4G) and support massive MIMO.

Accordingly, the 5G split BS requires a new fronthaul interface definition having a structure to reduce capacity of the fronthaul for transmitting a data packet to the radio module.

Accordingly, an embodiment of the present disclosure defines a new fronthaul interface to transmit data and signals to the radio module (DU) in the 5G split BS.

Particularly, an embodiment of the present disclosure considers the baseband pooling structure in which the processing function on the higher layer (PHY-low) is expanded/designed in addition to the RF processing function in the radio module (the DU in the case of the integrated DU model and the DU-low in the case of the separated DU model) of the 5G split BS.

Hereinafter, a communication system environment to which the BS apparatus according to an embodiment of the present disclosure is applied will be described with reference to FIG. 3.

Figure 3:
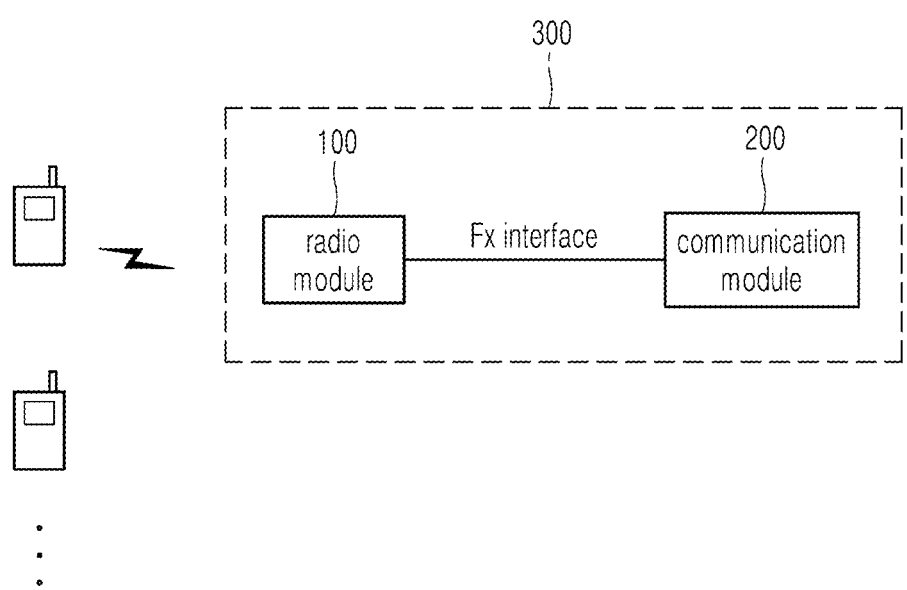
FIG. 3 illustrates a communication system environment including a BS apparatus according to an embodiment of the present disclosure.

As illustrated in FIG. 3, an BS apparatus 300 according to an embodiment of the present disclosure includes a radio module 100 configured to perform an RF processing function and a processing function on a Physical (PHY) layer and a communication module 200 connected to the radio module 100 and configured to perform a processing function on a higher layer than the processing function performed by the radio module 100.

At least one of data and signals may be transmitted between the radio module 100 and the communication module 200 of the BS apparatus 300 through a specific interface defined on the basis of a packet.

The BS apparatus 300 is a split BS separating the radio module (DU), especially, a 5G split BS having a lower layer split-based baseband pooling structure.

Accordingly, referring to FIG. 2A, when the BS apparatus 300 has the baseband pooling structure of the integrated DU model, the radio module 100 may be a radio module (DU) and the communication module 200 may be a BS module (CU).

Further, referring to FIG. 2B, when the BS apparatus 300 has the baseband pooling structure of the separated DU model, the radio module 100 may be a lower radio module (DU-low) and the communication module 200 may be a higher radio module (DU-high) including some processing functions on the PHY layer (PHY-high) and processing functions on the MAC layer and the RLC layer and connected to the BS module (CU) performing higher layer processing functions.

That is, when the BS apparatus 300 according to the present disclosure has the baseband pooling structure of the integrated DU model, the fronthaul between the radio module 100 (DU) and the communication module 200 (CU) transmits at least one of data and signals through a specific interface defined on the basis of a packet different from the conventional CPRI.

Further, when the BS apparatus 300 according to the present disclosure has the baseband pooling structure of the separated DU model, the fronthaul between the radio module 100 (DU-low) and the communication module 200 (DU-high) transmits at least one of data and signals through a specific interface defined on the basis of a packet different from the conventional CPRI.

As described above, the fronthaul interface (hereinafter, Fx interface) proposed by an embodiment of the present disclosure corresponds to both the fronthaul interface between the radio module 100 (DU) and the communication module 200 (CU) in the case of the baseband pooling structure of the integrated DU model and the fronthaul interface between the radio module 100 (DU-low) and the communication module 200 (DU-high) in the case of the baseband pooling structure of the separated DU model.

Hereinafter, for convenience of description, the radio module 100 and the communication module 200 will be described without separate description of the integrated DU model and the separated DU model.

That is, the radio module 100 and the communication module 200 described below may be understood as the DU 100 and the CU 200 based on the assumption of the baseband pooling structure of the integrated DU model, and may be understood as the DU-low 100 and the DU-high 200 based on the assumption of the baseband pooling structure of the separated DU model.

Specifically, in the present disclosure, the radio module 100 and the communication module 200 may encapsulate at least one of data and signals, which are to be transmitted, in a form of packet of a specific frame format defined for the Fx interface and transmit the encapsulated data or signal.

For example, in the present disclosure, a specific frame format (hereinafter, referred to as an Ethernet frame format) for the Fx interface may be defined through a frame format of Ethernet which is one of universal protocols for packet transmission.

In the case of downlink in which the communication module 200 performs transmission to the radio module 100, the communication module 200 may encapsulate data or signals, which are to be transmitted, in a form of packet of an Ethernet frame format defined for the Fx interface and transmit the data or signals.

In the case of uplink in which the radio module 100 performs transmission to the communication module 200, the radio module 100 may encapsulate data or signals, which are to be transmitted, in a form of packet of an Ethernet frame format defined for the Fx interface and transmit the data or signals.

As described above, when the fronthaul between the radio module 100 and the communication module 200 uses the universal protocol (for example, Ethernet) for packet transmission instead of the conventional CPRI, a cheap switching device may be used through configuration of a packet network of the fronthaul and an open-type fronthaul interface having easy interoperability of information for multi-vendor processing may be defined.

Meanwhile, the Fx interface proposed by an embodiment of the present disclosure may transmit at least one of data and signals between the radio module 100 and the communication module 200 on the basis of the Ethernet protocol.

Types of data and signals of the Fx interface are defined as four types below.

A first type is user plane data indicating I/Q modulation or bit information defined in a user plane, a second type is a radio-specific control signal which is time-critical and radio-specific control information which should be directly transmitted between the radio module 100 and the communication module 200, a third type is a general control signal which is operation-specific control information (for example, link setup and control) which should be directly transmitted between the radio module 100 and the communication module 200, and a fourth type is a C&M plane signal is control and management information defined in a control and management plane which should be transmitted within the radio module 100 and the communication module 200.

An embodiment of the present disclosure proposes in detail a method of transmitting user plane data (hereinafter, referred to as a data packet) among data and signals of four types which can be transmitted as described above through the Fx interface.

Hereinafter, a method of transmitting a data packet will be described in connection with the structure of a frame and a field defined by the fronthaul interface, that is, the Fx interface according to an embodiment of the present disclosure.

Figures 4A, 4B:
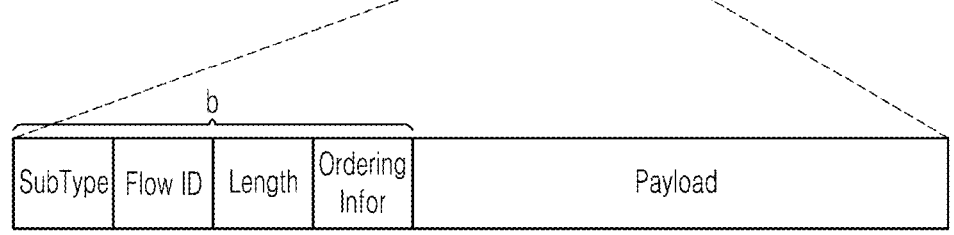

As illustrated in FIG. 4A, a frame format of the Fx interface, that is, an Ethernet frame format according to an embodiment of the present disclosure includes a common field including a subtype field which defines a type of a data packet to be transmitted through Ethernet payload and a payload field on which the data packet of the type defined by the subtype field is carried.

In the Ethernet frame format, Ethernet Framing complies with IEEE 802.3, wherein a destination address indicates a destination MAC address, a source address indicates a source MAC address, an Ethernet type indicates a protocol type encapsulated in Ethernet payload, and a frame check sequence indicates information for checking CRC between transmission and reception.

Accordingly, in the case of downlink in which the communication module 200 performs transmission to the radio module 100, the communication module 200 may configure the destination address, the source address, the Ethernet type, and the frame check sequence and transmit a data packet (user plane data), which is to be transmitted, in a form of packet of Ethernet frame format (A) in which the data packet is encapsulated in the Ethernet payload.

Similarly, in the case of uplink in which the radio module 100 transmits a signal to the communication module 200, the radio module 100 may configure the destination address, the source address, the Ethernet type, and the frame check sequence and transmit a signal, which is to be transmitted (particularly, a radio specific control signal) in the form of packet of the Ethernet frame format in which the signal is encapsulated in the Ethernet payload.

Further, the Ethernet payload of the Ethernet frame format includes a common field (b) and a payload field as illustrated in FIG. 4B.

Figure 5A:
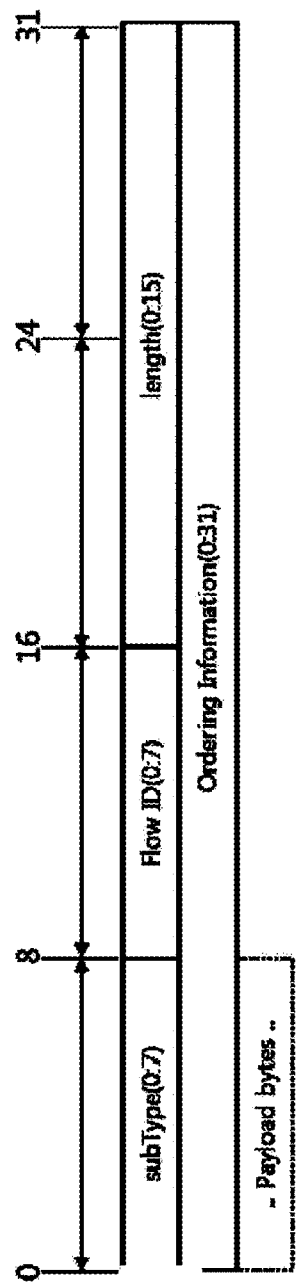

The common field (b) may be defined in a format as illustrated in FIG. 5A.

The common field (b) includes a subtype field that defines a type of a data packet to be transmitted through the Ethernet payload and also includes a flow ID field, a length field, and an ordering information field.

The data packet may be determined to have different types according to a processing function performed by the radio module 100 when a processing function for the radio module 100 is expanded/designed.

The type of the data packet may be classified into, for example, a CPRI data subtype indicating a data packet in a Common Public Radio Interface (CPRI) format, a time domain data subtype indicating I/Q data in a time domain, a frequency domain data subtype indicating I/Q data in a frequency domain, and a bit data subtype indicating a bit data stream as shown in [Table 1] below.

TABLE 1

| Subtype field value | Data packet type | Explanation |
| --- | --- | --- |
| 0000 0010b | CPRI data subtype | CPRI(Common Public Radio Interface) format data packet |
| 0001 000b | Time domain data sub type | Time domain payload packet |
| 0001 0001b | Frequency domain data sub type | Frequency domain payload packet |
| 0001 0010b | Bit data Subtype | Bit data payload packet |

In connection with this, when a data packet to be transmitted between the radio module 100 and the communication module 200 is the CPRI data subtype, the subtype field selects a field value corresponding to 0000 0010b and defines the corresponding data packet as the CPRI type.

As described above, the data packet defined as the CPRI type is transmitted while being carried on the payload field.

In this case, since C&M data is transmitted with I/Q data within the CPRI format, separate control packet transmission is not needed.

The I/Q data of the data packet of the CPRI format may be encapsulated in the Ethernet payload of the Ethernet frame format and transmitted in the form of packet of the Ethernet frame format defined for the Fx interface as illustrated in FIG. 4B.

Encapsulation into the Ethernet payload may be processed using, for example, a structure-agnostic mapper.

The structure-agnostic mapper may encapsulate information formatted as the conventional radio frame such as the CPRI into an Ethernet packet for the Fx interface.

Figures 7A, 7B:
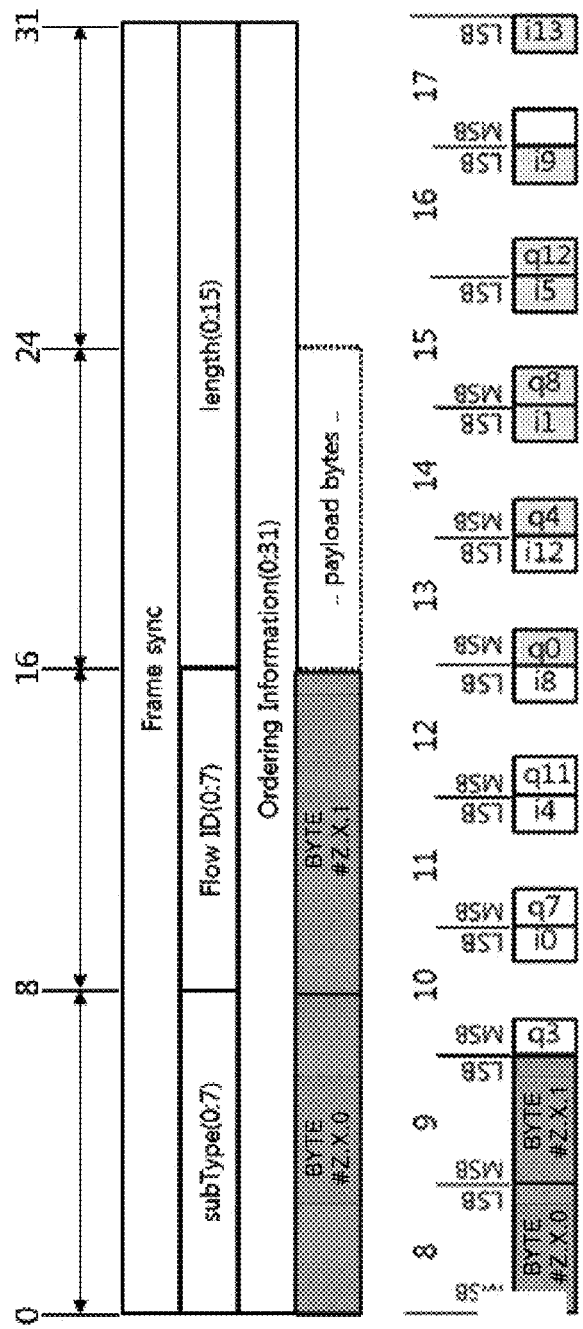

For reference, a basic frame format of I/Q data may be as illustrated in FIG. 6, and a format of the Fx interface into which I/Q data is encapsulated may be identified in FIG. 7A and a payload field into which I/Q data is encapsulated may be identified in FIG. 7B.

Referring back to [Table 1] above, when the data packet to be transmitted between the radio module 100 and the communication module 200 is the frequency domain data subtype, a field value corresponding to 0001 0001b may selected in the subtype field and the corresponding data packet may be defined as I/Q data of the frequency domain.

The I/Q data of the frequency domain includes I/Q modulation information, Sounding Reference Signal (SRS) information, and Physical Random Access Channel (PRACH) information.

In connection with this, when the type of the packet data to be transmitted is defined as I/Q data of the frequency domain, it is required to identify information within the I/Q data in an embodiment of the present disclosure.

Figure 5B:
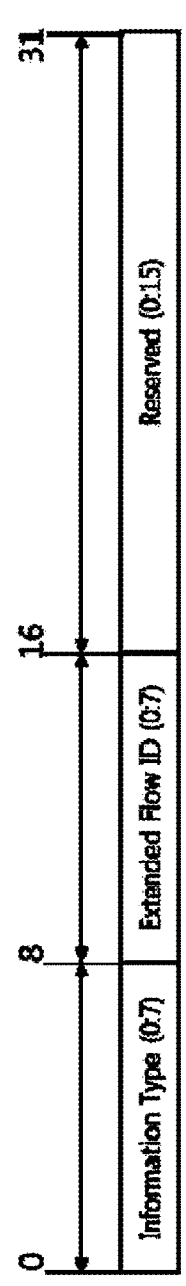

To this end, as illustrated in FIG. 5B, a payload sub-header of 4 bytes is allocated before payload bytes.

Figure 5C:
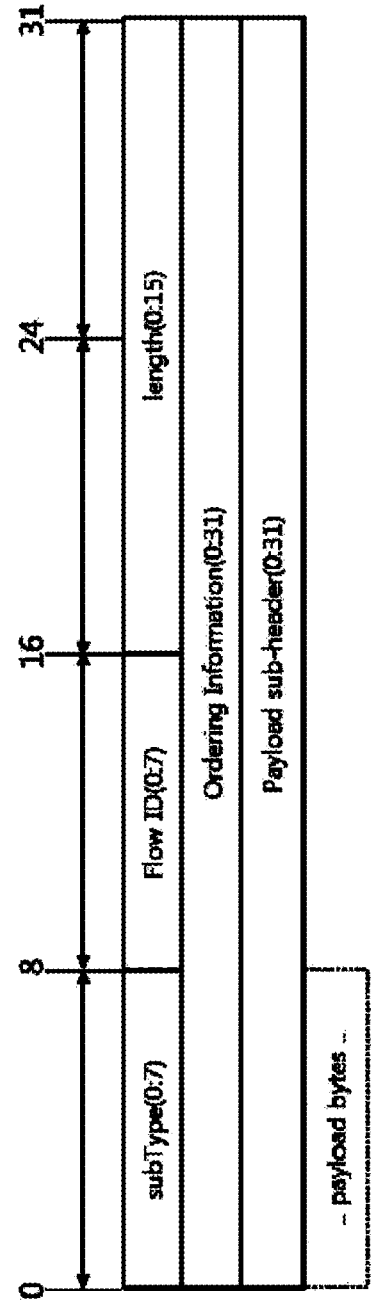

The payload sub-header is defined to include an information type field for identifying information within the I/Q data of the frequency domain and an extended flow ID field indicating which antenna corresponds to SRS information or PRACH information within the I/Q data of the frequency domain as illustrated in FIG. 5C.

Information included in the I/Q data of the frequency domain may be divided according to a field value of the information type field as shown in [Table 2] below.

TABLE 2

| Information type | Function | Note |
| --- | --- | --- |
| 0000 0000b | I/Q modulation information | Transmission of I/Q modulation information payload |
| 0000 0001b | SRS information | Transmission of SRS information to payload |
| 0000 0010b | PRACH information | Transmission of PRACH information to payload |
| 0000 0011b-1111 1111b | Reserved | |

In connection with this, when 0000 0000b is selected as an information type field value and I/Q data is identified as I/Q modulation information, a payload field is sequentially filled with samples of In-phase and Quadrature-phase from the MSB according to the number of sample width bits determined by a mapper.

The mapper for determining the number of sample width bits may be, for example, an Ethernet native mapper.

The Ethernet native mapper may encapsulate I/Q data of the time domain or the frequency domain or a bit signal into an Ethernet packet regardless of the conventional radio frame format.

For example, when the number of sample width bits defined by the Ethernet native mapper is 15 bits, I/Q modulation information is carried on the payload field as illustrated in FIG. 8.

Meanwhile, when I/Q sample data is transmitted, the payload field may transmit one or a plurality of antenna carrier samples.

Antenna carrier samples transmitted between two nodes, that is, the radio module 100 and the communication module 200 may be divided through a field value of a flow ID field that defines a specific flow between the radio module 100 and the communication module 200 as illustrated in FIG. 4B.

For reference, the payload size may be defined as a minimum of 48 bytes and a maximum of 1500 bytes.

As described above, when the signal of the frequency domain is transmitted through the Fx interface, I/Q modulation information is transmitted for each of antennas within the symbol.

One antenna information includes all tones within allocated frequency resources and I/Q bit information within the tones.

Further, packet data for each of antennas should be transmitted, including information on an antenna sequence and a symbol sequence.

Antenna information and symbol information of the packet for each of antennas may be defined to use an ordering information field within the common field.

Referring back to [Table 2] above, when 0000 0001b is selected as the information type field value and I/Q data is identified as Sounding Reference Signal (SRS) information, the identified SRS information may be packetized separately from I/Q modulation information and then transmitted while being carried on the payload field.

In connection with this, channel information of all antennas is needed for BF used by the massive MIMO system. In this case, a bandwidth of an interface transmitted from the radio module 100 to the communication module 200 should be reduced.

Accordingly, information on all antennas should be transmitted after the information is reduced to information on some of the antennas or layers like digital BF, pre-filtering, or Rx combining, and to this end it is required to separate SRS information in advance.

As a result, according to an embodiment of the present disclosure, I/Q data is identified as Sounding Reference Signal (SRS) information, and when the SRS information is separated in advance in order to reduce the bandwidth of the interface transmitted from the radio module 100 to the communication module 200 (an interface transmitted from the radio module (DU) to the BS module (CU) or from the lower radio module (DU-low) to the higher radio module (DU-high)), the SRS information is packetized separately from I/Q modulation information and then transmitted while being carried on the payload field.

Referring back to [Table 2] above, when 0000 0010b is selected as the information type field value and I/Q data is identified as Physical Random Access Channel (PRACH) information, the identified SRS information may be packetized separately from I/Q modulation information and then transmitted while being carried on the payload field.

In connection with this, the tone of the Physical Random Access Channel (PRACH) has Sub-Carrier Spacing (SCS) different from that of the tone of a Physical Uplink Control Channel (PUCCH) or a Physical Uplink Shared Channel (PUSCH).

Accordingly, the PRACH should be separated through PRACH filtering before FFT of UL time domain I/Q data. The radio module 100 packetizes PRACH information separately from I/Q modulation information and then carries the PRACH information on the payload field to transmit the same to the communication module 200.

Referring back to [Table 1] above, when the data packet to be transmitted between the radio module 100 and the communication module 200 is the time domain data subtype, a field value corresponding to 0001 0000b may be selected in the subtype field and the corresponding data packet may be defined as I/Q data of the time domain.

The I/Q data of the time domain includes I/Q modulation information and Sounding Reference Signal (SRS) information.

Accordingly, when the type of the data packet to be transmitted is defined as I/Q data of the time domain, it is required to identify information within the I/Q data in an embodiment of the present disclosure.

To this end, similar to FIG. 5B, a payload sub-header of 4 bytes is allocated before payload bytes.

Similar to FIG. 5C, the payload sub-header is defined to include an information type field for identifying the information within the I/Q data of the frequency domain and an extended flow ID field for indicating which antenna corresponds to SRS information within the I/Q data of the frequency domain.

Information included in the I/Q data of the frequency domain may be divided according to a field value of the information type field as shown in [Table 3].

TABLE 3

| Information type | Function | Note |
| --- | --- | --- |
| 0000 0000b | I/Q modulation information | Transmission of I/Q modulation information to payload |
| 0000 0001b | SRS information | Transmit SRS information to payload |
| 0000 0011b-1111 1111b | Reserved | |

In connection with this, when 0000 0000b is selected as an information type field value and I/Q data is identified as I/Q modulation information, a payload field is sequentially filled with samples of In-phase and Quadrature-phase from the MSB according to the number of sample width bits determined by a mapper.

The mapper for determining the number of sample width bits is, for example, an Ethernet native mapper.

The Ethernet native mapper may encapsulate I/Q data of the time domain or the frequency domain or a bit signal into an Ethernet packet regardless of the conventional radio frame format.

For example, when the number of sample width bits defined by the Ethernet native mapper is 15 bits, I/Q modulation information is carried on the payload field as illustrated in FIG. 8.

Meanwhile, when I/Q sample data is transmitted, the payload field may transmit one or a plurality of antenna carrier samples.

Antenna carrier samples transmitted between two nodes, that is, the radio module 100 and the communication module 200 may be divided through a field value of a flow ID belonging to the common field (b) of FIG. 4B, which defines a specific flow between the radio module 100 and the communication module 200.

For reference, the payload size may be defined as a minimum of 48 bytes and a maximum of 1500 bytes.

As described above, when the signal of the time domain is transmitted through the Fx interface, I/Q modulation information is transmitted for each of antennas within the symbol.

One antenna information includes all tones within allocated frequency resources and I/Q bit information within the tones.

Further, packet data for each of antennas should be transmitted, including information on an antenna sequence and a symbol sequence.

Antenna information and symbol information of the packet for each of antennas may be defined using an ordering information field within the common field.

Further, in connection with [Table 2] described above, when 0000 0001b is selected as the information type field value and I/Q data is identified as Sounding Reference Signal (SRS) information, the identified SRS information may be packetized separately from I/Q modulation information and then transmitted while being carried on the payload field like in the frequency domain.

Referring back to [Table 1] above, when the data packet to be transmitted between the radio module 100 and the communication module 200 is the bit data subtype, a field value corresponding to 0001 0010b may selected in the subtype field and the data packet may be defined as a bit data stream.

The bit data stream is also transmitted while being carried on the payload field.

Bit ordering may be based on IEEE std 754-2008TM and defined on the basis of the MSB within 1 Octet as illustrated in FIG. 10.

According to the embodiment of the present disclosure described above, the radio module 100 and the communication module 200 may define the type of the data packet to be transmitted by selecting the field value of the subtype field. Further, since the data packet of which the type is defined is encapsulated and transmitted in the form of packet of the Ethernet frame format, it is possible to support smooth transmission of the data packet by accommodating all types of data packets which may vary depending on expansion/design of the processing function of the radio module 100.

Meanwhile, referring back to FIG. 4B, the flow ID field within the common field (b) is used to define the specific flow between two end points, that is, the radio module 100 and the communication module 200 defined by a source address and a destination address within the Ethernet frame format.

Through the flow ID field, 255 flows from flow 0 to flow 254 may be multiplexed within the two end points.

A flow ID identifier does not have a separate routing function.

For reference, a field value selected in the flow ID field may be defined as [Table 4] below.

TABLE 4

| Subtype field value | Packet type | Explanation |
| --- | --- | --- |
| 0000 0000b-1111 1110b | Flow ID number | Identifier for specific flow between two nodes |
| 1111 1111b | Not a flow | Used when there is no flow information and information on all nodes should be transmitted |

Referring to back to FIG. 4B, the length field within the common field (b) indicates the number of all octets of the Ethernet frame format (a) and does not include a frame check sequence length for an Ethernet protocol. An Ethernet header of the Ethernet frame format (a) itself does not have a length field.

In connection with this, when a data packet is transmitted between the radio module 100 and the communication module 200 according to an embodiment of the present disclosure, the flow between the radio module 100 and the communication module 200 is defined by selecting a field value of the subtype field and selecting a field value of the flow ID field.

Further, by selecting a field value of the length field, the radio module 100 and the communication module 200 mutually recognize the number of all octets of the Ethernet frame format, and thus reliability of the connection between the radio module 100 and the communication module 200 can be secured.

Figure 9:
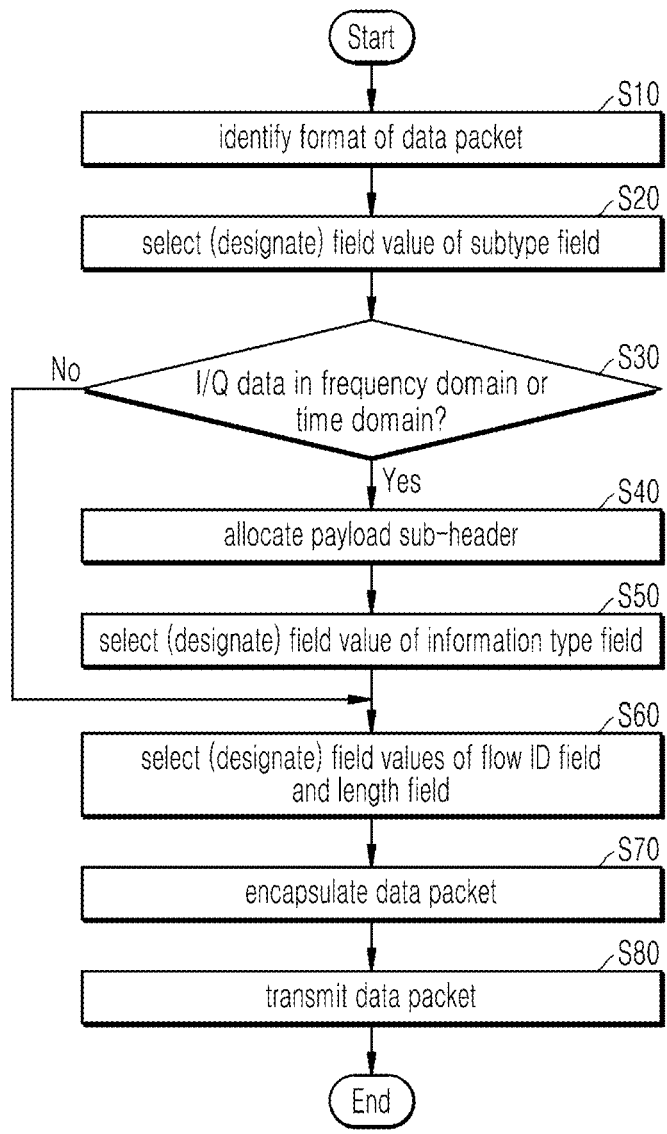
FIG. 9 is a flowchart illustrating operation flow of a data packet transmission method according to an embodiment of the present disclosure.

Hereinafter, a method of transmitting a data packet according to an embodiment of the present disclosure will be described with reference to FIG. 9.

Meanwhile, the method of transmitting the data packet relates to a technology for transmitting a data packet between the communication module 200 (CU in the case of an integrated DU model and DU-high in the case of a separated DU model) and the radio module 100 (DU in the case of an integrated DU model and DU-low in the case of a separated DU model) in a split BS having a lower layer split-based baseband pooling structure.

Further, the data packet transmitted between the communication module 200 and the radio module 100 may be understood as user plane data among data and signals of four types which can be transmitted through a new fronthaul interface, that is, an Fx interface proposed by an embodiment of the present disclosure.

For convenience of description, the following description will be made on the basis of downlink in which the communication 200 transmits a data packet to the radio module 100.

First, the communication module 200 performs a procedure of defining a type to be transmitted to the radio module 100.

The data packet may be divided into a Common Public Radio Interface (CPRI) format, an I/Q data format in a time domain, I/Q data in a frequency domain, and a bit data stream.

In connection with this, the communication module 200 identifies the type of the data packet to be transmitted to the radio module 100. When the identified type of the data packet is the Common Public Radio Interface (CPRI) format or the bit data stream format, the communication module 200 selects the field value of the subtype defined in the common field (b) within the Ethernet frame format as illustrated in FIG. 4B so as to define the type of the data packet to be transmitted in S10 to S20.

For example, when the data packet is the CPRI data subtype, the subtype field selects a field value corresponding to 0000 0010b and defines the corresponding data packet as the CPRI type.

When the data packet is the bit data subtype, the subtype field selects a field value corresponding to 0001 0010b and defines the data packet as the bit data stream.

When the data packet is the frequency domain data subtype, the subtype field selects a field value corresponding to 0001 0001b and defines the corresponding data packet as I/Q data of the frequency domain.

When the data packet is the time domain data subtype, the subtype field selects a field value corresponding to 0001 0000b and defines the corresponding data packet as I/Q data of the time domain.

Meanwhile, when the type of the data packet is defined as the I/Q data format in the frequency domain or the time domain on the basis of the result of definition of the type of the data packet, the communication module 200 allocates a payload sub-header of 4 bytes before payload bytes as illustrated in FIG. 5B in S30 to S40.

The payload sub-header is defined to include an information type field for identifying information within the I/Q data of the frequency domain or the time domain and an extended flow ID for indicating which antenna corresponds to SRS information or PRACH information within the I/Q data of the frequency domain as illustrated in FIG. 5C.

For reference, the I/Q data in the time domain does not include PRACH information unlike the I/Q in the frequency domain.

When allocation of the payload sub-header is completed, the communication module 200 selects the field value of the information type field and thus identifies information within the I/Q data in the frequency domain or the time domain in S50.

For example, when information included in the I/Q data is I/Q modulation information, 0000 0000b is selected as the information type field value and the information included in the I/Q data is identified as I/Q modulation information.

When the information included in the I/Q data is Sounding Reference Signal (SRS) information, 0000 0001b is selected as the information type field value and the information included in the I/Q data is identified as Sounding Reference Signal (SRS) information.

When the information included in the I/Q data is Physical Random Access Channel (PRACH) information, 0000 0010b is selected as the information type field value and the information included in the I/Q data is identified as Physical Random Access Channel (PRACH) information.

Subsequently, when definition of the format of the data packet is completed, the communication module 200 defines flow for the radio module 100 with regard to the connection with the radio module 200 and designates the number of all octets of the Ethernet frame format in S60.

That is, the communication module 200 defines flow with the radio module 100 by selecting the field value of the subtype field within the common field (b) and selecting the field value of the flow ID field as illustrated in FIG. 4B.

Further, the radio module 100 and the communication module 200 mutually recognize the number of all octets of the Ethernet frame format by selecting the field value of the length field, so that reliability of the connection between the radio module 100 and the communication module 200 is secured.

Thereafter, the communication module 200 packetizes the data packet, of which the type is defined, in the form supported by a new fronthaul interface, that is, the Fx interface proposed by an embodiment of the present disclosure and transmits the data packet to the radio module 100 in S70 to S80.

The I/Q data of the data packet of the CPRI format may be encapsulated into the Ethernet payload of the Ethernet frame format and transmitted in the form of packet of the Ethernet frame format defined for the Fx interface as illustrated in FIG. 4B.

Encapsulation into the Ethernet payload may be processed using, for example, a structure-agnostic mapper.

The structure-agnostic mapper may encapsulate information formatted as the conventional radio frame such as the CPRI into an Ethernet packet for the Fx interface.

For reference, a basic frame format of I/Q data may be as illustrated in FIG. 6, and a format of the Fx interface into which I/Q data is encapsulated may be identified in FIG. 7A and a payload field into which I/Q data is encapsulated may be identified in FIG. 7B.

In the case of I/Q data being identified as I/Q modulation information in the frequency domain or the time domain, the payload field is sequentially filled with samples of In-phase and Quadrature-phase from the MSB according to the number of sample width bits determined by the mapper.

The mapper for determining the number of sample width bits is, for example, an Ethernet native mapper.

The Ethernet native mapper may encapsulate I/Q data of the time domain or the frequency domain or a bit signal into an Ethernet packet regardless of the conventional radio frame format.

For example, when the number of sample width bits defined by the Ethernet native mapper is 15 bits, I/Q modulation information is carried on the payload field as illustrated in FIG. 7.

Meanwhile, when I/Q sample data is transmitted, the payload field may transmit one or a plurality of antenna carrier samples.

Antenna carrier samples transmitted between two nodes, that is, the radio module 100 and the communication module 200 may be divided through a field value of a flow ID field that defines a specific flow between the radio module 100 and the communication module 200 as illustrated in FIG. 4B. For reference, the payload size may be defined as a minimum of 48 bytes and a maximum of 1500 bytes.

As described above, when the signal of the frequency domain is transmitted through the Fx interface, I/Q modulation information is transmitted for each of antennas within the symbol in which case all tones within allocated frequency resources and I/Q bit information within the tones are included in one antenna information.

Packet data for each of antennas should be transmitted including information on an antenna sequence and a symbol sequence, and antenna information and symbol information of the packet for each of antennas may be defined using an ordering information field within the common field.

Meanwhile, in the case of I/Q data identified as Sounding Reference Signal (SRS) information in the frequency domain or the time domain, the identified SRS information may be packetized separately from I/Q modulation information and then transmitted while being carried on the payload field.

I/Q data identified as Physical Random Access Channel (PRACH) information may be also packetized separately from I/Q modulation information and then transmitted while being carried on the payload field like the SRS information.

Through the method of transmitting data according to an embodiment of the present disclosure, a type of a data packet to be transmitted between the radio module 100 and the communication module 200 may be defined by selecting a field value of a subtype field. Further, since the data packet of which the type is defined is encapsulated and transmitted in the form of packet of the Ethernet frame format, it is possible to support smooth transmission of the data packet by accommodating all types of data packets which may vary depending on expansion/design of the processing function of the radio module 100.

In addition, the method of transmitting the data packet according to an embodiment of the present disclosure may be implemented in the form of a program instruction executable through various computer means and recorded in a computer-readable medium. The computer readable medium may include a program command, a data file, a data structure, and the like independently or in combination. The program command recorded in the medium may be things specially designed and configured for the present invention, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present invention, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A Base Station (BS) apparatus comprising:
    a radio module configured to perform at least one processing function of a plurality of processing functions required to transmit a data packet by the BS apparatus; and
    a communication module configured to perform the remaining processing functions of the plurality of processing functions,
    wherein the communication module is configured to transmit the data packet to the radio module by:
        receiving the data packet at the communication module;
        determining a specific type of the data packet, received at the communication module, based on the at least one processing function to be performed by the radio module;
        designating a field value within an Ethernet frame format of a specific interface so as to define the determined specific type of the data packet to be transmitted to the radio module, wherein the Ethernet frame format includes:
            a common field including a subtype field for defining the type of the data packet and a payload sub-header allocated to select a field value for identifying the data packet of the specific type, and
            a payload field for the data packet,
        encapsulating the data packet, having the defined specific type of the data packet, to be supported by the specific interface, wherein the data packet having the defined specific type of the data packet is encapsulated into the payload field of the Ethernet frame format, wherein the data packet of the specific type is I/Q data in a frequency domain or a time domain, and the I/Q data is defined as one of I/Q modulation information, Sounding Reference Signal (SRS) information, and Physical Random Access Channel (PRACH) information according to the field value of a payload sub-header, and
        transmitting, through the specific interface to the radio module, packet having the Ethernet frame format that includes the encapsulated data packet having the defined specific type of the data packet within the payload field.

2. The BS apparatus of claim 1, wherein the common field further includes:
    a flow ID field for defining flow related to connection between nodes corresponding to the radio module and the communication module, and
    a length field to indicate a number of all octets of the frame format.

3. The BS apparatus of claim 1, wherein the I/Q modulation information is packetized and transmitted for each of antennas within a symbol, and
    each piece of the SRS information and the PRACH information is packetized and transmitted separately from the I/Q data for transmission of information on all antennas.

4. The BS apparatus of claim 1, wherein the communication module is a BS module including at least one processing function on a PHY layer and processing function on a layer higher than at least one processing function on the PHY layer or a higher radio module including at least one processing function on the PHY layer and processing functions on a Medium Access Control (MAC) layer and a Radio Link Control (RLC) layer and connected to a BS module including processing functions on a Packet Data Convergence Protocol (PDCP) layer and a layer higher than the PDCP layer.

5. A method of transmitting a data packet, the method comprising:
- receiving, by a communication module, the data packet;
- determining, by the communication module, a specific type of the data packet, received at the communication module, based on at least one processing function to be performed by a radio module;
- designating, by the communication module, a field value within an Ethernet frame format of a specific interface so as to define the determined specific type of the data packet to be transmitted to the radio module, the communication module being connected to theft radio module configured to perform the at least one processing function among a plurality of processing functions required to transmit the data packet in a Base Station (BS) apparatus and the communication module configured to perform the remaining processing functions among the plurality of processing functions;
- encapsulating, by the communication module, the data packet, having the defined specific type of the data packet, to be supported by the specific interface, wherein the data packet having the defined specific type of the data packet is encapsulated into a payload field of the Ethernet frame format, wherein the data packet of the specific type is I/Q data in a frequency domain or a time domain, and the I/Q data is defined as one of I/Q modulation information, Sounding Reference Signal (SRS) information, and Physical Random Access Channel (PRACH) information according to a field value of a payload sub-header; and
- transmitting, through the specific interface to the radio module, packet having the Ethernet frame format that includes the encapsulated data packet having the defined specific type of the data packet within the payload field.

6. The method of claim 5, wherein the Ethernet frame format includes:
- a common field having a subtype field that includes identification information for defining the type of the data packet, and
- the payload field for the data packet.

7. The method of claim 6, wherein the common field further includes:
- a flow ID field for defining flow related to connection between nodes corresponding to the radio module and the communication module, and
- a length field to indicate a number of all octets of the frame format.

8. The method of claim 6, further comprising:
- when the data packet is defined as the specific type based on the field value of the subtype field, allocating the payload sub-header for selecting the field value for identifying the data packet of the specific type to the common field before the transmitting.

9. The method of claim 5, wherein the I/Q modulation information is packetized and transmitted for each of antennas within a symbol, and each piece of the SRS information and the PRACH information is packetized and transmitted separately from the I/Q data for transmission of information on all antennas.

* * * * *